US007657634B2

(12) United States Patent
Zheng et al.

(10) Patent No.: US 7,657,634 B2
(45) Date of Patent: Feb. 2, 2010

(54) QUALITY OF SERVICE SUPPORT AT AN INTERFACE BETWEEN MOBILE AND IP NETWORK

(75) Inventors: Haihong Zheng, Coppell, TX (US); Marc Greis, Stein (DE)

(73) Assignee: Nokia Corporation, Espoo (FI)

( * ) Notice: Subject to any disclaimer, the term of this patent is extended or adjusted under 35 U.S.C. 154(b) by 685 days.

(21) Appl. No.: 10/526,699

(22) PCT Filed: Aug. 6, 2004

(86) PCT No.: PCT/US2004/025398

§ 371 (c)(1),
(2), (4) Date: Apr. 26, 2006

(87) PCT Pub. No.: WO2005/015413

PCT Pub. Date: Feb. 17, 2005

(65) Prior Publication Data

US 2006/0246900 A1    Nov. 2, 2006

Related U.S. Application Data

(60) Provisional application No. 60/493,430, filed on Aug. 6, 2003, provisional application No. 60/500,499, filed on Sep. 5, 2003.

(51) Int. Cl.
*G06F 13/00* (2006.01)
(52) U.S. Cl. .................. 709/228; 709/219; 709/225; 709/230
(58) Field of Classification Search ................ 709/217, 709/219, 223, 226, 227, 228, 229, 249, 250
See application file for complete search history.

(56) References Cited

U.S. PATENT DOCUMENTS 5,590,268 A    12/1996    Doi et al.

(Continued)

FOREIGN PATENT DOCUMENTS

EP    1126659 A2    8/2001

(Continued)

OTHER PUBLICATIONS

Kawakami, Hiroshi, "Network Mobility Support for UMTS Networks" (CS2003-30), IEICE technical report, Japan, The Institute of Electronics, Information and Communication Engineers, Jun. 13, 2003, vol. 103, No. 126, p. 1-7.

(Continued)

*Primary Examiner*—Viet Vu
(74) *Attorney, Agent, or Firm*—Harrington & Smith, PC

(57) ABSTRACT

A signaling regimen between a mobile station MS, a radio node RN, and a packet data switching node PDSN enables a quality parameter to be applied to packets moving between a mobile and a CDMA2000 network. The MS creates a new flow for packets of a certain data type and sends a related quality parameter for that flow to the BS. The BS determines whether an existing or new service instance will carry the new flow, and obtains authorization for the service instance to meet the quality parameter from the PDSN. The BS or PDSN builds a map between flow and a policy that ensures the quality is met, and the map is used to place different packets into the appropriate flow and service instance. Policies and enforcement may differ on uplink and downlink.

24 Claims, 7 Drawing Sheets

U.S. PATENT DOCUMENTS

| | | |
|---|---|---|
| 6,269,402 B1 | 7/2001 | Lin et al. .................... 709/227 |
| 6,654,610 B1 | 11/2003 | Chen et al. .................. 455/450 |
| 6,980,523 B1* | 12/2005 | Lipford et al. .............. 370/252 |
| 2002/0114305 A1 | 8/2002 | Oyama et al. ............... 370/338 |
| 2002/0133600 A1 | 9/2002 | Williams et al. ............ 709/228 |
| 2003/0221016 A1* | 11/2003 | Jouppi et al. ................ 709/245 |
| 2006/0165027 A1* | 7/2006 | Heden ........................ 370/328 |

FOREIGN PATENT DOCUMENTS

| | | |
|---|---|---|
| EP | 1154600 A1 | 11/2001 |
| EP | 1154663 A1 | 11/2001 |
| EP | 1257140 A1 | 11/2002 |
| JP | 06-337884 | 12/1994 |
| WO | WO99-39528 | 8/1999 |
| WO | WO 03/049468 A1 | 6/2003 |

OTHER PUBLICATIONS

Hiroshi Kawakami, "Network Mobility Support for UMTS Networks" (CS2003-30), IEICE Technical Report, Japan, The Institute of Electronics, Information and Communication Engineers, Jun. 13, 2003, vol. 103, No. 126, p. 1-7.

* cited by examiner

QUALITY OF SERVICE SUPPORT AT AN INTERFACE BETWEEN MOBILE AND IP NETWORK

CROSS REFERENCE TO RELATED APPLICATION

This application claims priority to provisional U.S. Patent Application 60/500,499, filed on Sep. 5, 2003 and 60/493,430 filed on Aug. 6, 2003, through co-pending International Application No. PCT/US04/25398, filed on Aug. 6, 2004.

FIELD OF THE INVENTION

The invention relates in general to the prioritization of data between network nodes using a DiffServ architecture. Specifically, a method and system for assuring a quality of service for different data packets at a radio node and a packet data switching node in a combined CDMA2000/3GPP2 network is described, though the invention may be applied to other combined networks.

BACKGROUND

Without limiting the scope of the invention, its background is described in connection with network architectures that prioritize data according to type. With the internet protocol (IP) becoming increasingly ubiquitous for different types of data (e.g., voice over IP or VoIP, streaming video, e-commerce) across different sub-networks (e.g., mobile, fixed, virtual private) comes the need to manage the different types to achieve a minimum quality of service as the data moves among different portions or nodes of the overall network. Whereas IP traditionally is a best-effort approach for delivering packets, mobile networks rely upon a minimum bit error rate. Two regimens to assure reliability among different sub-networks are in use: integrated services or IntServ, where the end nodes of a network path signal their specific QoS need to the network; and differentiated services or DiffServ, where data packets carry classification information that network nodes use to determine an applicable QoS. Different QoS is necessary in an efficient network because different applications (e.g., different types of data packets) have varying needs for delay, jitter, packet loss, variation, and other QoS metrics. For example, VoIP requires very low jitter (one way jitter about 100 millisec) and bandwidth between about 8-64 Kbps, whereas file transfer applications generally do not suffer from jitter but are highly susceptible to corruption by packet loss. Assuring a quality of service, rather than only a best effort packet relay as in traditional internet-protocol (IP) network paths, further enables differential pricing by network operators for customers demanding high reliability.

An embodiment of the invention relates to DiffServ, of which the general architecture is based on the general concept that traffic (e.g., data packets) entering a network is classified and possibly conditioned (e.g., marked, metered, policed, shaped) at the boundaries or 'edge routers' of the data pathway through the network, and assigned to different behavior aggregates. Each behavior aggregate is identified by a single Differentiated Services Code Point (DSCP), which is a bit stream in the header of each packet (currently, 6 bits). Within the core of the network (internal nodes not at the 'edge' of a data pathway), packets are forwarded according to a "per-hop" behavior PHB associated with the DSCP. Per-hop behavior represents thresholds within which the packet moves among network nodes; for example, bounds for delay, jitter, bandwidth, etc., and are used for allocating buffer and bandwidth resources at each node among competing traffic streams. Well-defined PHB is used with packet markings to achieve a scalable QoS solution for any given packet. In DiffServ then, signaling for QoS is eliminated at least within the network core, so the number, of packet states required to be kept at each network node is reduced considerably. For example, the internal routers or nodes need not track per-application flow or per-customer forwarding states for transient packets. The end result is that complexity is pushed to the edge of the network in DiffServ to keep the (typically more numerous) core routers or nodes simple and fast.

The edge routers in a DiffServ domain are also termed ingress or egress nodes, depending on the traffic direction. FIG. 1 depicts a prior art overview of a CDMA2000/3GPP2 combined network 20 in which a DiffServ architecture might be used. A mobile network 22, such as one employing 3GPP2 protocols, includes a radio node RN 24 (e.g., a base station BS) that serves as the ingress node for uplink traffic from a mobile station MS 26 under control of that RN 24. A first message 28 from the MS passes through the RN 24 and to a packet data switching node (PDSN) 30. Once leaving the PDSN 30, the packet must carry attributes that will allow routers and other nodes within the CDMA2000 network 32 to convey that packet with a certain quality without each having to 'open' the packet and independently determine the appropriate pathway necessary to satisfy the desired quality. For a second message 34 from the IP-based network 32 to the MS 26, the PDSN 30 serves as the egress node. The means (e.g., per hop behavior) used by the IP-based network 32 to meet a quality criteria is generally not directly adaptable to the mobile network 22. The interface between the RN 24 and the PDSN 30 is generally termed the R-P network or R-P interface. There are currently broad concepts for the R-P interface to facilitate DiffServ among the broader 32 and mobile 22 networks, but no specific details as to how such functionality might be implemented are known to the inventors except for downlink traffic on a service instance carrying one flow, described below.

In the current 3GPP2 standardization [3GPP2 P.S0001 C.4], flow mapping and treatment is introduced to map a particular downlink flow to a service instance. A main service instance represents one R-P connection and is identified by a unique identifier (SR_ID) carried in initializing the R-P connection. As described in 3GPP2 specification [3GPP2 X.S0011-004-C, ver. 1.0, August 2003; sections 3 and 3.2 et seq.], in addition to a main service instance, a MN 26 may open one or more auxiliary service instances, on the same or a different R-P connection as the main service instance, to carry traffic that is not suitable for the main service instance. Typically, the main service instance is used to carry signaling that initializes and updates a connection between the MS 26 and the PDSN 30, and different auxiliary service instances associated with the main are used to carry the different types of data (e.g., streaming video, email). A (preferably auxiliary) service instance may carry multiple flows, a flow being a specific instantiation of a protocol layer sequence through which packets on that flow are transported. In order to effectively use the auxiliary service instance, the PDSN 30 needs to be informed about packet filters. Packet filters are information that the PDSN 30 uses to map which packet is to be sent on which service instance. A Traffic Flow Template TFT, sent by the MS to support one service instance, carries the MS IP address (which may change as the MS 26 moves between home and foreign networks) and packet filter components, such as but not limited to packet destination IP address and port number, protocol type, and type of service. One TFT corresponds to one service instance (identified by SR_ID), allowing the PDSN 30 to put packets of different types into different auxiliary service instances.

The flow mapping mechanism described above appears capable of mapping only a downlink packet to a particular auxiliary service instance. Further, because it maps a downlink packet only to a service instance without describing how a particular flow on that service instance might be distinguished, it appears operable only when all flows on that service instance (if more than one) assure the same packet quality. While one document [TR45: Interoperability Specification (IOS) for cdma200 Access Network Interfaces—Part 2 Transport", PN-4545.2-RV3, Ballot Version October 2002] broadly states that radio access network policies or local policies defined by service providers can be used by the RN and the PDSN to mark and condition the uplink and downlink traffic, it does not define a mechanism to do so. The prior art particularly describes the mapping of only downlink packets to a service instance in order to assure a quality of service in the mobile network, and does not appear to enable flows of different packet quality on the same service instance. What is needed in the art is a way to implement quality of service in a DiffServ architecture at the R-P interface to assure quality on both uplink and downlink traffic, preferably a quality that may differ among flows on the same service instance.

SUMMARY OF THE INVENTION

This invention is in one aspect a method for establishing a flow within a connection. The method includes receiving at a wireless network node a first request message. This first request message includes at least one quality parameter for the flow. Further, the method includes granting a plurality of quality of service parameters. The method continues in sending from the wireless network node a second request message that includes one or more granted quality of service parameters, which may be the same as the at least one quality parameter used in the first request message. Preferably, the wireless network node is a radio node and the connection is between the wireless network node and a further node such as a PSDN.

In another aspect, the invention is a signaling protocol that may be used to enable an assured quality on a flow between a radio node and a packet switching data node. The radio node receives from the mobile station a request that includes at least one quality of service parameter for the flow. Subsequently, the radio node sends to the mobile station a grant of a set of quality of service parameters for the flow. The radio node further sends a registration request to the packet data switching node that includes the granted set of quality of service parameters for the flow. Then, the radio node receives from the packet switching data node a registration reply that authorizes the flow.

In yet another aspect, the invention is a wireless network node, such as a wireless base station, that has a receiver, a controller, and a transmitter. The receiver is for receiving a QoS parameter request message that includes at least one quality of service parameter for a flow within a connection. The controller is coupled to the receiver, and is for determining whether a subject connection, on which a flow satisfying the set of at least one quality parameters between at least a base station and a mobile station is to be carried, is a preexisting connection or a new connection. The transmitter is coupled to the controller and is for sending, in response to the controller determining as above, a service connection grant message to the mobile station.

These and other features, aspects, and advantages of embodiments of the invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The invention is described below more particularly with reference to the following drawing figures, which are not to scale except where stipulated.

DETAILED DESCRIPTION

Further to the background description above, the prior art does not appear capable of determining which flow a packet should be transported when more than one flow exists on a service instance, and does not provide a mechanism for the PDSN 30 to obtain the QoS requirement of different flows inside an auxiliary service instance. Rather than merely add service instances for each flow, embodiments of the invention seeks to enable multiple flows within each (preferably auxiliary) service instance to result in less R-P connections and better use of available bandwidth (due to less signaling to set up and maintain excess R-P connections) in the mobile network 22. In order to provide the DiffServ based QoS at the R-P interface, the DiffServ functionality for the edge routers (e.g., packet classification, marking, metering, policing and shaping) should be implemented in the RN 24 and the PDSN 30. In order to perform these functions, the disclosed embodiments provide a signaling mechanism so that all the Quality of Service (QoS) related information is relayed and/or configured at the RN 24 and the PDSN 30.

Embodiments of the invention present an improved method and system for enabling traffic flow management between ingress and egress nodes of a DiffServ network, with several variances for uplink and downlink traffic. Each approach has the mobile node or station MS 26 providing QoS requirements to the RN 24 and PDSN 30 to assure a quality for packets within a flow. Preferably, in each separate embodiment described, QoS requirements are signaled at the link level using a known format such as "QoS_BLOB" (as defined in TIA/IS-707-A-3), or at the IP level via an extended dynamic flow mapping mechanism. Also described are specific details as to how such QoS information is used at the RN 24 and the PDSN 30 to provide QoS support to the R-P interface and external network 32.

While the use and implementation of particular embodiments of the invention are presented in detail below, it will be understood that the invention provides many inventive concepts that can be embodied in a wide variety of contexts. The specific embodiments discussed herein serve as non-limiting illustrations for making and using the invention, and are not intended to limit its scope or the ensuing claims.

Figure 1:
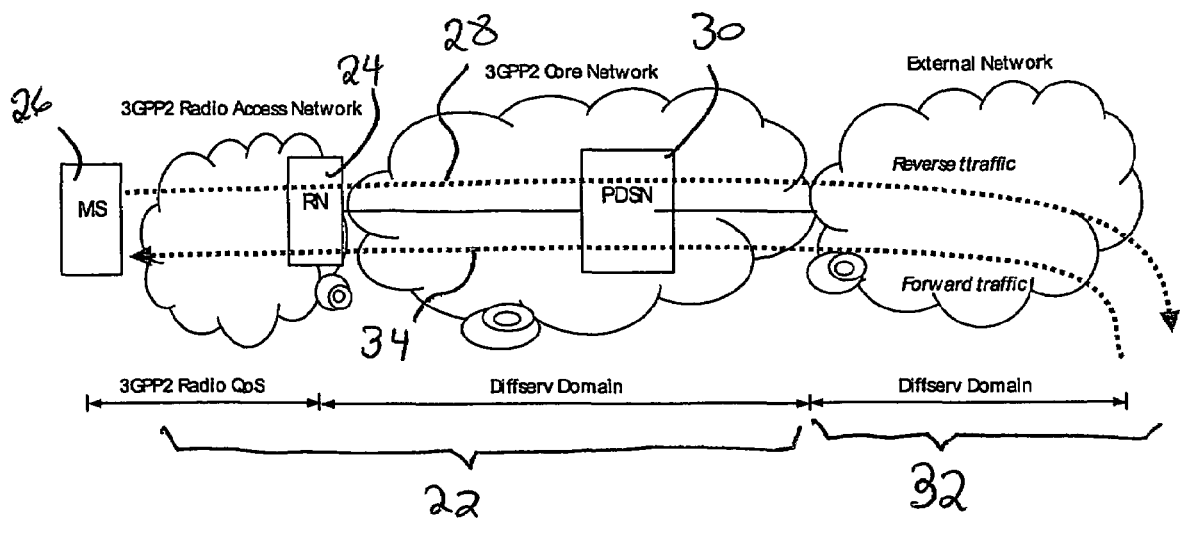
FIG. 1 is a prior art overview of packets moving between a mobile station and an external network via a radio node RN and a packet data switching node PDSN.
Figure 2:
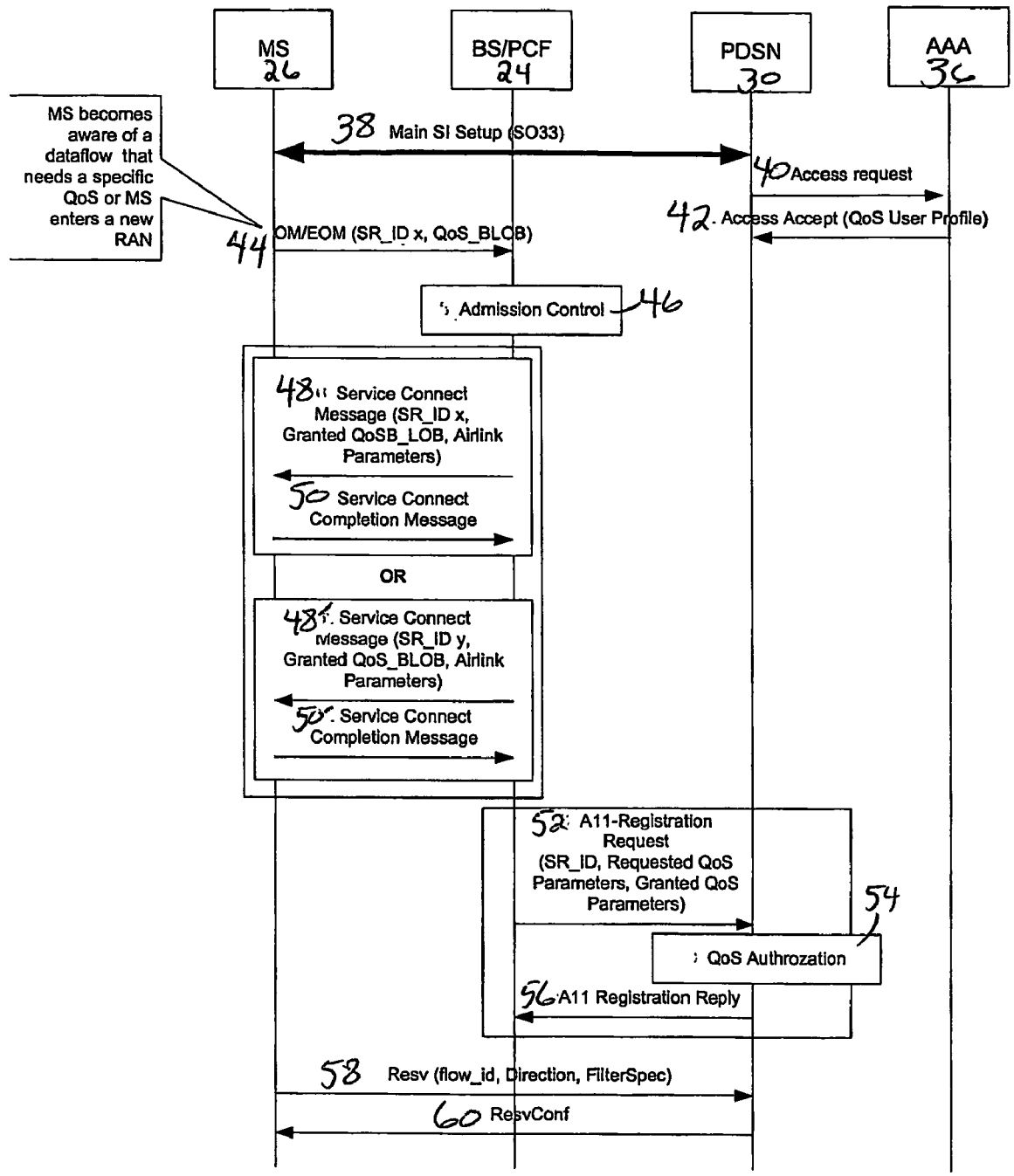
FIG. 2, divided among two sheets as FIGS. 2A and 2B, is a signaling diagram between nodes of the network of FIG. 1 that enables QoS DiffServ in both uplink and downlink directions at initial setup of a service instance.

FIG. 2 provides a signaling regimen between the MS 26, the RN 24, and the PDSN 30, with some peripheral signaling between the PDSN 30 and an Authentication, Authorization and Accounting node (AAA) 36. The AAA 36 is generally a separate server that provides authorization for a MS 26 to operate within its home network or cooperating foreign networks, such as when the MS is moving out of its home network area, when a particular auxiliary service instance must be routed through a foreign network, and the like. The AAA 36 serves to authenticate a particular MS 26, authorizes it to use some or all services of the home network or foreign networks with which the home network has a service level agreement SLA, and to track accessed services and other metrics used to calculate payments according to the SLA or user agreement. FIG. 2 (which includes continuous FIGS. 2A and 2B) represents the preferred embodiment of the invention.

Initially, the MS 26 and the PDSN 30 setup 38 a main service instance as known in the art. This may be initialized by the MS 26 in the case of initiating uplink traffic 28, or by the PDSN 30 through the base station BS 24 in the case of initiating downlink traffic 34. The PDSN 30 submits an access request 40 to the AAA 36 concerning the particular MS 26. The AAA 36 authenticates the particular MS 26, and if authorized, provides an acceptance message 42 to the PDSN 30 that includes a subscriber profile of the MS 26. The subscriber profile may include quality of service parameters associated with the MS user: for example, the MS user may be a premium or gold user whose network service contract assures a minimum reliability for file transfers, authorizes reception of digital video broadcast (DVB-H) at an assured quality, and the like for different types of data. Quality among the different types of data is generally reflected as QoS parameters such as but not limited to bandwidth (bits per second), maximum packet delay (milliseconds), and acceptable packet loss rate (%). QoS parameters within the QoS user/subscriber profile are subject to change and evolution with increasing refinements to DiffServ and packet transport quality, and may be variable dependant upon activity in the mobile network 22, time of day (e.g., user profile provides one QoS that is valid between 7 am and 7 pm, and a higher QoS that is valid at other times), etc., all without departing from the invention.

Sometime after the main service instance is established 38, the MS 26 becomes aware of a dataflow for which a specific QoS parameter is relevant or desired. For example, the MS 26 may prepare to transmit a digital photograph attached to an email text, or may prepare to receive a digital video broadcast. Alternatively, the MS 26 may be moving between radio access networks. In either case, the MS 26 creates a flow and an identifier for each flow that it desires to be established in order to send the relevant data (e.g., one flow for packets of the digital photo, another for packets of the email text, etc.). Term this MS_FLOW_ID, recognizing that a flow is a series of packets that share a specific instantiation of (IETF) protocol layers. The MS 26 transmits to the RN 24 a QoS parameter request message 44, which includes at least those QoS parameters relevant to the MS-created dataflow and the identifier for the new flow, MS_FLOW_ID. Preferably, these parameters are in the QoS_BLOB format defined in the prior art. In the example of FIG. 2, the QoS parameter message 44 includes a service instance identifier (SR_ID x) that uniquely identifies a new R-P connection to be set up that carries the flow MS_FLOW_ID created by the MS 26. Assume for example that the requested parameter is a minimum bandwidth of m bits per second for the flow MS_FLOW_ID. It is notable that the QoS parameter of the message 44 is a request, and that the parameter is associated within a single message with a specific service instance identifier (SR_ID x) and a specific flow identifier (MS_FLOW_ID) that was created by the MS 26.

Following receipt of the requested QoS parameter(s), the RN 24 performs admission control 46. In admission control 46, the RN 46 determines whether the mobile network 22 can fulfill the quality indicated in the QoS request message 44, for example, via the home or a foreign network. Two options are shown: a new service instance (SR_ID x) is set up at messages 48-50, and an existing service instance (SR_ID y) is reconfigured at messages 48'-50'.

In the first option, admission control 46 at the RN 24 determines that network facilities are available to meet the requested QoS parameter (e.g., of m bps minimum bandwidth), and a new service instance, identified as SR_ID x, is set up as follows. This option may occur where the main service instance that was set up at reference number 38, or any other existing service instances for that MS 26, cannot be adapted to the QoS parameter of the MS-created new flow. The RN 24 sends a service connect message 48 to the MS 26 that includes the identifier for the existing service instance (SR_ID x), a grant of the QoS parameter (e.g., minimum x bps bandwidth), and connection parameters for the airlink for the traffic between the MS 26 and the base station 24. This message 48 should also include the flow identifier created by the MS 26 to which the QoS grant applies, which in FIG. 2 is inherent in the QoS_BLOB format.

Where a new connection is required to be established (e.g., an A10 connection), the RN 24 coordinates with the PDSN 30 in a registration request message 52, which may be in parallel with or following the service connect message 48 and service connect completion message 50. For ready adoption within existing infrastructure, preferably the registration request message 52 is of the A11 message format. However, the embodiments of the invention include both the service instance identifier (e.g., SR_ID x) and at least one (preferably both) of the requested and granted QoS parameter(s) that were previously exchanged between the MS 26 and the RN 24 at messages 44 and 48, as well as the flow identifier to which the QoS parameter relates. The PDSN 30 authorizes 54 the new service instance (SR_ID x) which meets the QoS parameter of the registration request 52. This grants the QoS parameter request, because the flow created by the MS 26 (identified as MS_FLOW_ID) is within that new service instance. Once authorized 54, the PDSN 30 sends a registration reply message 56 to the RN 24 informing it that the new service instance (SR_ID x) is established that meets the requested QoS parameter.

In the second option, the RN 24 decides at admission control 46 to carry the flow on an existing service instance (SR_ID y). Assume for this example that the existing service instance is an auxiliary service instance that enables a maximum packet delay of y milliseconds, where the requested QoS parameter is minimum bandwidth of x bps. The RN 24 reconfigures the parameters of the existing service instance (SR_ID y) to those of the request (e.g., x bps bandwidth), and sends a service connect message 48' to the MS 26 that includes the applicable service instance identifier (e.g., SR_ID y), a grant of the x bps bandwidth, and connection parameters for the airlink for the traffic between the MS 26 and the base station 24. As above, the flow identifier created by the MS 26 is also within this message 48'. In either option described by messages 48-50 and 48'-50' and above, the MS 26 replies with a service connect completion message 50, 50' to set up the traffic channel airlink.

Where a new connection is not required and an existing connection is reconfigured, signaling is similar to that described above for a new connection with the following exceptions. The registration request 52 from the RN 24 to the PDSN 30 includes the service instance identifier (e.g., SR_ID y) and the modified granted QoS parameter(s) that were previously sent to the MS 26 at message 48', as well as the flow identifier to which the QoS parameter relates. The PDSN 30 authorizes 54 the existing service instance (SR_ID y) to meet the QoS parameter(s) of the registration request 52. Once authorized 54, the PDSN 30 sends a registration reply message 56 to the RN 24 informing it that the existing service instance (SR_ID y) is modified to meet the requested (and now granted) QoS parameter.

To complete the signaling before packets are sent on the uplink 28 or downlink 34 along the new flow, the MS 26 sends a reservation RESV message 58 that carries the flow identification (MS_FLOW_ID), the direction of the flow (uplink 28 or downlink 34), and the filter parameters for the auxiliary service instance. The RESV message 58 may be generically termed a filter message, as it carries information concerning filtering packets. In the prior art, the packet filter parameters are generally in a transport flow template TFT format, an embodiment that may continue with the invention for ready adoption by the affected networks, though the format alone is not limiting. This RESV message 58, which may be on this main service instance established at the main service instance setup 38 or on an auxiliary service instance of the new flow, informs the PDSN 30 which packets are to go into which flow, and consequently how the packets will move through the internal nodes of the external (IP-based) network 32. For example, if two flows are set up (either within one or two service instances), one for still photos and one for voice over IP, the RESV message 58 identifies which differentiated services code point (DSCP), which is in the packet header, goes into which flow. The single TFT may inform as to multiple flows and multiple filters where more than one flow is active for the subject MS 26. The PDSN 30 replies with a RESV confirmation message 60. The end result is that the PDSN 30 has information to map each packet to a specific flow using only bits of the packet headers.

For example, assume as above that two flows are set up: one for a still photo and one for VoIP. The DSCP is six bits, so the MS 24 informs the PDSN 30 in the RESV message 58 that a packet with the value 011101 in the DSCP header should go into a first flow. That the first flow is associated only with one service instance is inherent within the service instance/flow framework. It is unnecessary that the PDSN 30 be aware that packets bearing that specific DSCP relate to a still photo; only the map is necessary in the PDSN 30 and the MS 26 determines the appropriate QoS parameter for the underlying data type in creating the flow. That same RESV message 58 informs that packets with DSCP header value of 011110 go into a second flow, which may or may not be over the first service instance. Each of these flows has a different QoS due to the different nature of the underlying data: packets from the photo are somewhat delay insensitive but the resultant photo may be noticeably corrupted by packet loss, whereas VoIP packets are delay sensitive but relatively packet loss insensitive. The different QoS parameters used to set up the data flows reflect the underlying data type, but the data flows are created in the MS 26 and not in the RN 24 or the PDSN 30. The RESV message 58 informs the PDSN 30 which packets go into which data flow, and the PDSN 30 builds a map of DSCP to data flow. While the MS may transmit a photo packet that is sequentially disposed between two VoIP packets, the PDSN 30 separates them with knowledge only of the DSCP in the header. Nodes internal to the CDMA2000 network 32 that further transmit the packets need not open the headers or even be aware of the map, because they are operating on a Integrated Services IntServ model where the flow through the network is predetermined upon the packet's entry into the edge of that network. Those internal nodes merely relay without knowledge of QoS, potential alternative flows, underlying data type, or the like. That the relay internal to the CDMA2000 network 32 satisfies the quality of service requested by the MS 26 (and granted by the PDSN 30 and RN 24), and not merely reflect a best effort attempt to move the packet along, is accomplished in DiffServ by the efficient signaling disclosed herein.

Figure 3:
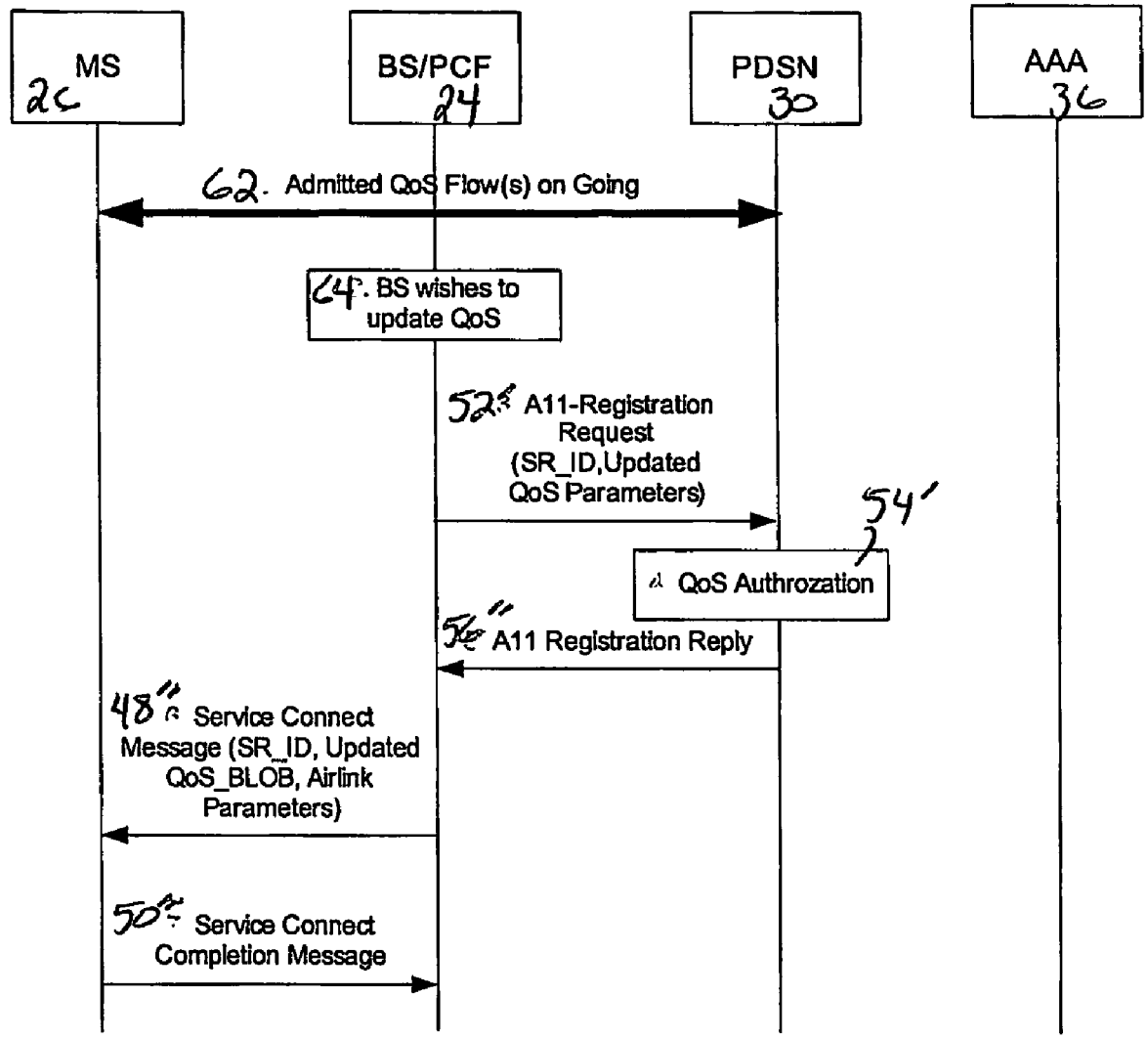
FIG. 3 is similar to FIG. 2 but showing signaling to modify QoS in an existing service instance.

FIG. 3 is a signaling diagram similar to that of FIG. 2, but in the context of an already-established service instance to which a QoS parameter is updated by the RN 24. That context is reflected as an ongoing flow 62 (over any service instance) between the MS 26 and the PDSN 30 via the RN 24 or base station BS, and may occur when the RN/BS 24 desires to modify the ongoing flow 62 due to changing traffic or radio conditions. The RN 24 chooses which QoS parameter to update 64 for a particular flow, and sends a registration request message 52' to the PDSN 30, carrying the relevant service instance (SR_ID), flow (MS_FLOW_ID), and the updated QoS parameter(s) for that connection and flow. The PDSN 30 authorizes the updated QoS parameter(s) 54', and sends a registration reply 56' back to the RN 24 granting the updated QoS parameter(s). Upon successful authorization, the RN 24 sends to the MS 26 a service connect message 48", which in the context of FIG. 3 includes the service instance identifier (SR_ID), the flow identifier (MS_FLOW_ID), the updated and granted QoS parameter(s), and any relevant airlink parameters if the airlink itself is also changed. The MS 26 replies with a service connect completion message 50". Where the QoS parameter of a specific flow is being upgraded (e.g., minimum bandwidth changed from x bps to 2x bps), the messages 48" and 50" must follow messages 52' and 56'; otherwise, they may occur in parallel.

Where a flow is no longer needed, the MS 26 makes the determination itself and signals the RN 24 identifying the flow to be removed, the service instance in which it lies, and its associated QoS parameter. The RN 24 sends a registration request to the PDSN 30 including the QoS parameters received from the MS 26, the flow identifier and the service instance. If no other flows are carried on the relevant service instance, the RN 24 may also request disconnection of that service instance in the registration request message. The PDSN 30 deletes the packet filters for that flow and sends a registration reply message to the RN 24. The RN 24 then sends a service connect message to the MS 26 to indicate that the flow is removed, and if no other flows are carried on that service instant and the entire service instant is disconnected, then the RN 24 also disconnects the service instance in the service connect message. The MS 26 replies to the RN 24 with a service connect completion message.

Figure 4A:
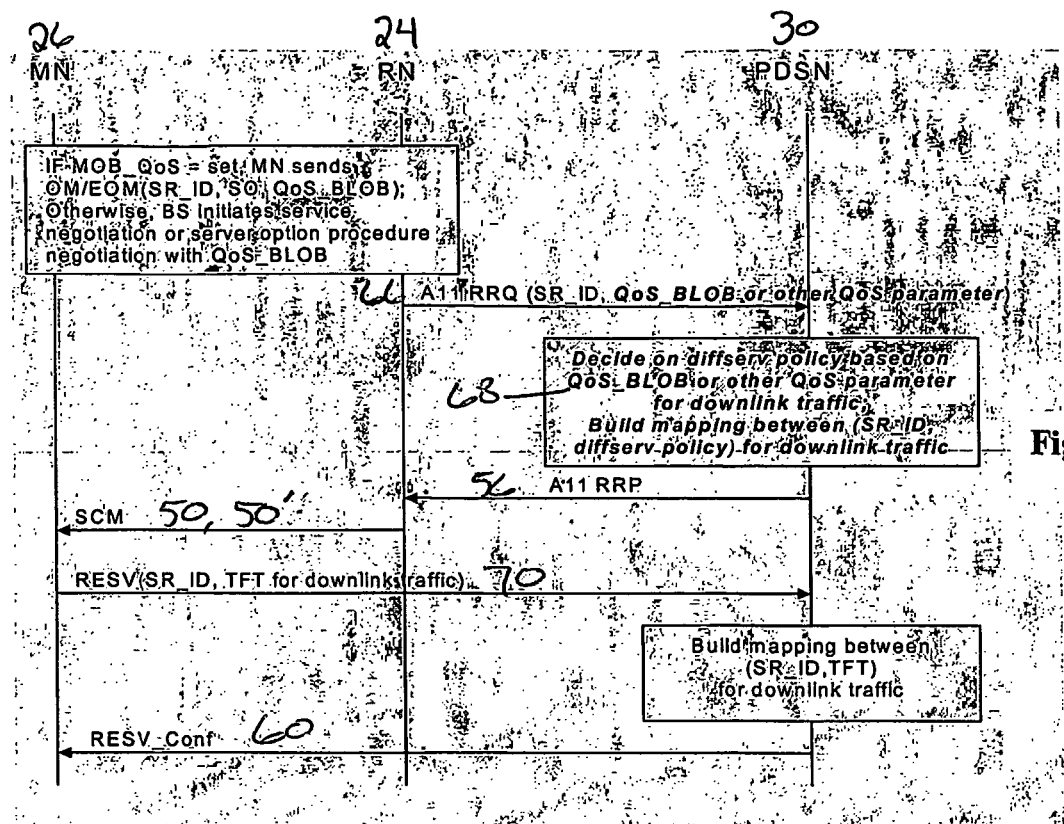
FIG. 4A is a signaling diagram showing specific treatment of downlink traffic in a first alternative embodiment.

The essence of FIG. 2 is that the RN 24 obtains or derives the QoS requirement from the MS 26 and then sends the QoS requirement to the PDSN 30. Separate treatment of downlink and uplink traffic using this information, according to a first alternative embodiment, is shown in FIG. 4A (downlink) and FIG. 4B (uplink). A second alternative embodiment for separate treatment of uplink and downlink traffic is shown in FIG. 5A (downlink) and FIG. 5B (uplink). A third alternative embodiment for uplink traffic is shown in FIG. 6. Each of these is supplementary to the signaling of FIG. 2, and show uplink and downlink enforcement of policies decided at the PDSN 30 or the RN 24. Where shown also in the alternative embodiments, messages described in FIG. 2 are modified in the alternative embodiments, made apparent by the message titles, message contents, and/or the accompanying explanatory text.

On the downlink of FIG. 4A, the RN 24 sends a registration request 66 to the PDSN 30, but in this first alternative embodiment, the message 66 includes the service instance identifier and the QoS_BLOB message (which includes the QoS parameters). The PDSN 30 decides 68, based on the request message 66, on a DiffServ policy (examples below) for the downlink traffic 34, and thereby build a map between the service instance and the DiffServ policy that is used to map downlink packets 34 to the proper service instance and flow. The PDSN 30 then sends a registration reply message 56 after authorization, and the RN 24 sends a service connect message 50, 50' as previously described. The MS 26 then sends a filter or RESV message 70 that is similar to the RESV message 58 previously described, but in this instance it need not include the flow identifier, as that is already provided to the PDSN 30 in the QoS_BLOB portion of the registration request message 66. Instead, this filter message 70 includes the service instance identifier and the TFT (with filter parameters for the flow) for downlink traffic. The PDSN 30 uses this additional information on the filters to map the DiffServ policy to the flows (using the packet filters) via the service instance identifier.

DiffServ policies may include, but are not limited to, DSCP marking as previously noted, and/or traffic policing/shaping policies, and may also take into account the subscription profile 42 described in FIG. 2. The definition of these policies may vary among different mobile network 22 operators, though two different examples are given. As an example of a DiffServ marking policy, assume a downlink packet having QoS parameters of a) requested bandwidth of x bps, b) requested maximum delay of y ms, and c) acceptable loss rate of z %, are to be marked with a DSCP value of 011001. Other QoS parameter combinations and thresholds equate to a different DSCP value. As an example of a DiffServ marking traffic policing/shaping policy, assume a streaming application (which may be specified by a traffic class or an application ID) used by a high priority user (e.g., a user paying a premium for enhanced service) should not exceed Xbps during certain hours, such as those in which the mobile network 22 traditionally carries heavier traffic. Such a DiffServ marking traffic policing/shaping policy could be specified in the specific user QoS profile, or may be defined by the local mobile network 22 for its specific limitations. Although the RN 24 may be aware of those policies, instead of overloading the RN 24-MS 26 interface by enforcing them at that juncture (which is traditionally the most bandwidth-limited), the PDSN 30 can enforce the policies for downlink traffic 34 by dropping or shaping the out-of-profile packets based on such a policy before they reach the RN 24. As downlink traffic passes the PDSN 30, the PDSN 30 maps the packets into the correct service instance based on the TFT, and marks the packet with the correct DSCP associated with the SR_ID. Other possible DiffServ functions (e.g., policing, shaping) can be performed as well, as noted above.

Figure 4B:
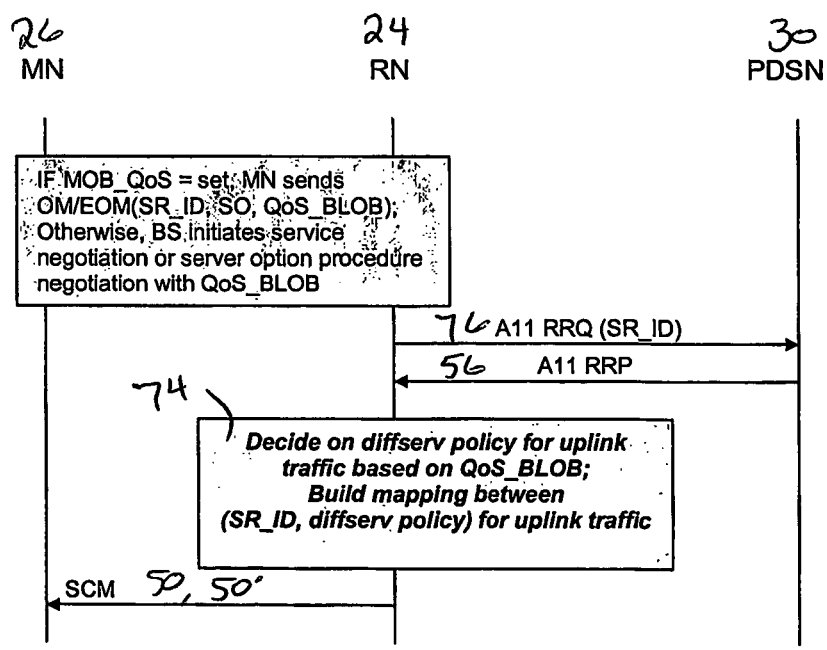
FIG. 4B is a signaling diagram showing specific treatment of uplink traffic in the first alternative embodiment.
Figure 5A:
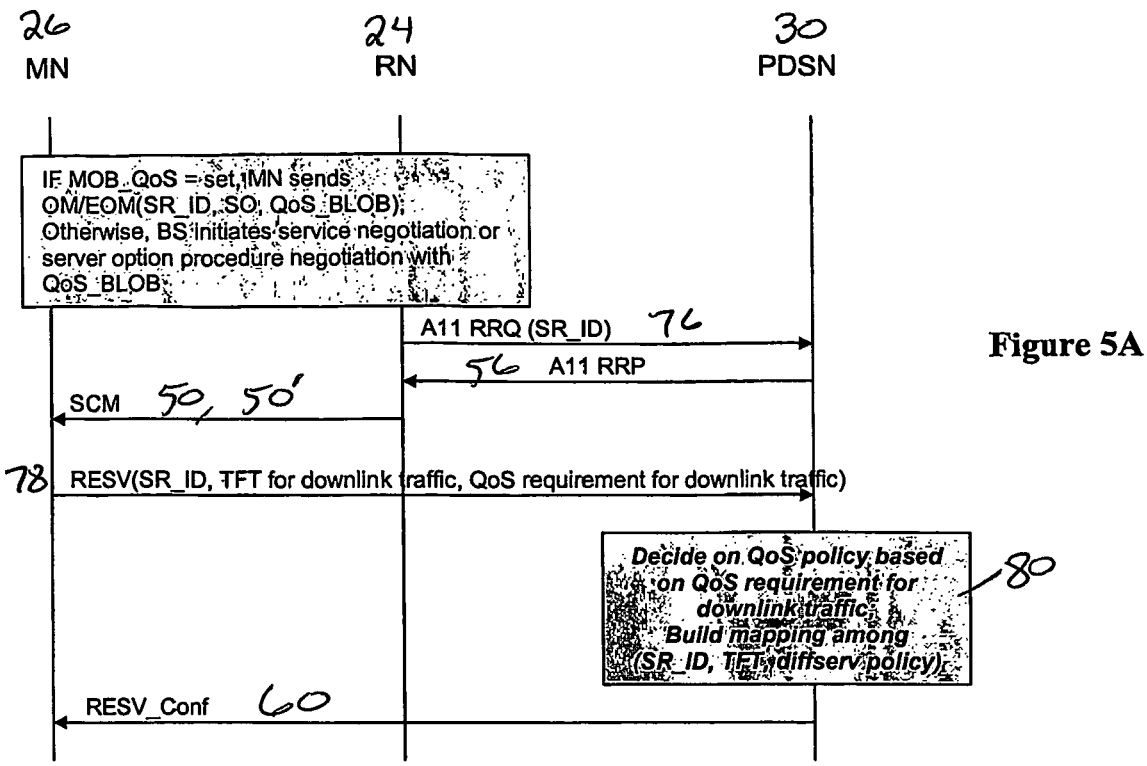
FIG. 5A is a signaling diagram showing specific treatment of downlink traffic in a second alternative embodiment.

On the uplink as shown in FIG. 4B for this first alternative embodiment, the QoS parameter(s) and the flow identifier is directly mapped to DSCP and other DiffServ policies. After obtaining that information from the MS 26, the RN 24 decides 74 which DiffServ policies (e.g., DSCP marking) are to be applied to the service instance, then establishes the mapping between SR_ID and DiffServ policy. The registration request 76 need only include the service instance identifier, as the mapping for this uplink 28 flow is at the RN 24.

Figure 5B:
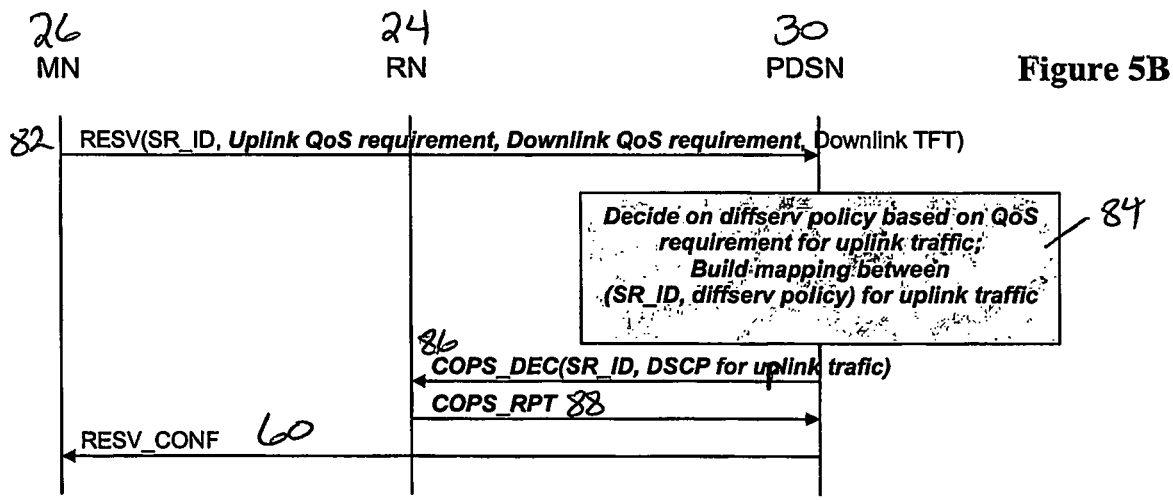
FIG. 5B is a signaling diagram showing specific treatment of uplink traffic in the second alternative embodiment.
Figure 6:
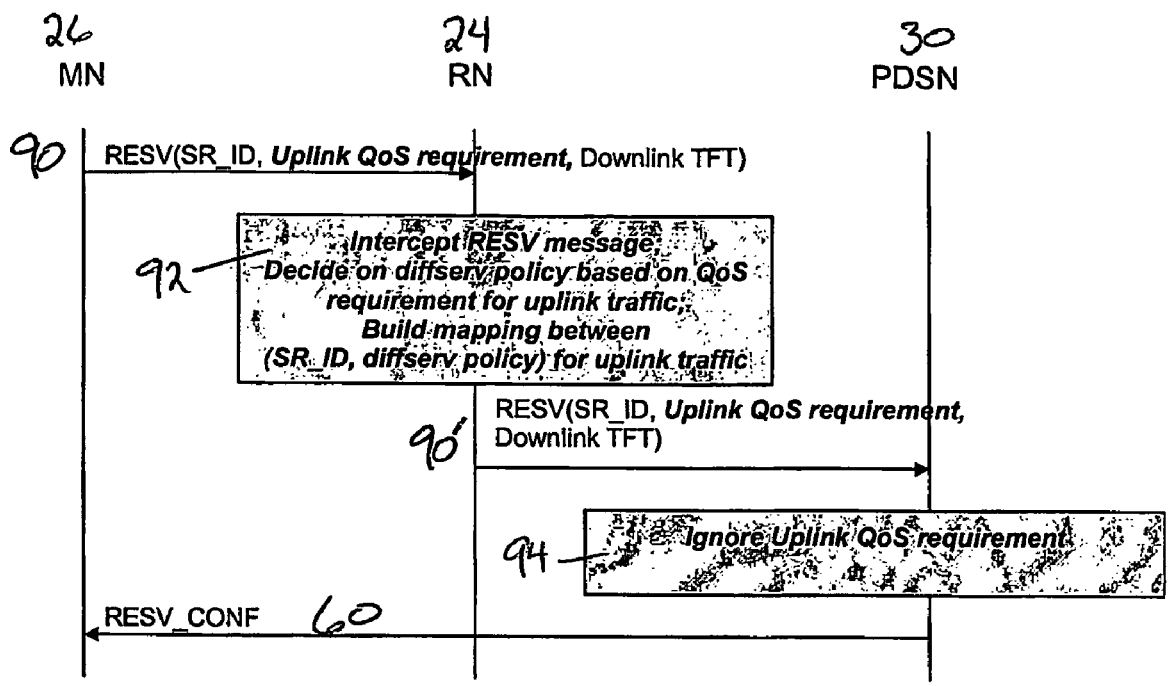
FIG. 6 is a signaling diagram showing specific treatment of uplink traffic in a third alternative embodiment.

A second alternative is depicted at FIG. 5A (downlink) and FIG. 5B (uplink). In FIG. 5A, the MS 26 sends downlink QoS requirements to the PDSN 30, along with the TFT which carries the downlink flow filters, in the RESV message 78. The QoS requirement carried in the RESV message includes the same information as noted above, or may include a new information element or the FLOWSPEC format defined for DiffServ. After receiving the RESV message 78, the PDSN 30 decides 80 a DiffServ policy to be applied, based on the QoS requirement for the downlink traffic, and creates the mapping between the flow (via the filters of the TFT), the service instance which carries the flow (SR_ID) and any relevant DiffServ policy such as those in the examples above. The registration request 76 need only include the service instance identifier, and the registration reply 56 and RESV or filter confirmation 60 messages are as previously described.

For the uplink in this second alternative embodiment as shown in FIG. 5B, the MS 26 sends a RESV message 82 to the PDSN 30, which includes the service instance identifier, uplink and downlink QoS parameters, and filter parameters for the downlink (TFT). The PDSN 30 uses that information to decide 84 on a DiffServ policy for the uplink traffic and builds a map between the service instance and the DiffServ policy. The PDSN 30 then signals 86 the RN 24 to execute the uplink traffic handling policy decided by the PDSN 30. Preferably, this message 86 devolving enforcement of the policy is in the known COPS format, and carries the service instance identifier and the decided policy that is to be applied to uplink traffic on that service instance. Alternatively, the message 86 may be a modified A11 message. Since the RN 24 already knows the flow created by the MS 26 (from message 44 of FIG. 2), the service instance identified in the message 86 is used to uniquely identify to the RN 24 the relevant flow of that service instance to which the DiffServ policy is to be enforced. An acknowledgment message 88 of some form is sent to the PDSN 30, and the PDSN 30 then sends a confirmation message 60 to the MS 26.

FIG. 6 shows a third alternative embodiment for the specific treatment of uplink 28 traffic. The MS 26 sends a RESV or filter message 90 which carries the service instance identifier, the uplink QoS parameter(s), and the downlink filter parameters (TFT). The RN 24 receives that RESV message 90. In this embodiment, besides forwarding 90' that message 90 to the PDSN 30, the RN 24 intercepts 92 the RESV message 90, decides on a DiffServ policy for uplink traffic, and maps the service instance identifier to the DiffServ policy. The PDSN 30 ignores 94 the uplink QoS parameter(s) because in this embodiment, the RN 24 enforces the DiffServ policy for the uplink traffic. The PDSN 30 sends a confirmation message 60 to the MS 26 as previously described.

Although the solutions for uplink and downlink traffic are diagrammed separately, the correspondent solutions can be merged together, including mixing uplink and downlink solutions for the different preferred and alternative embodiments.

Figures 7A, 7B:
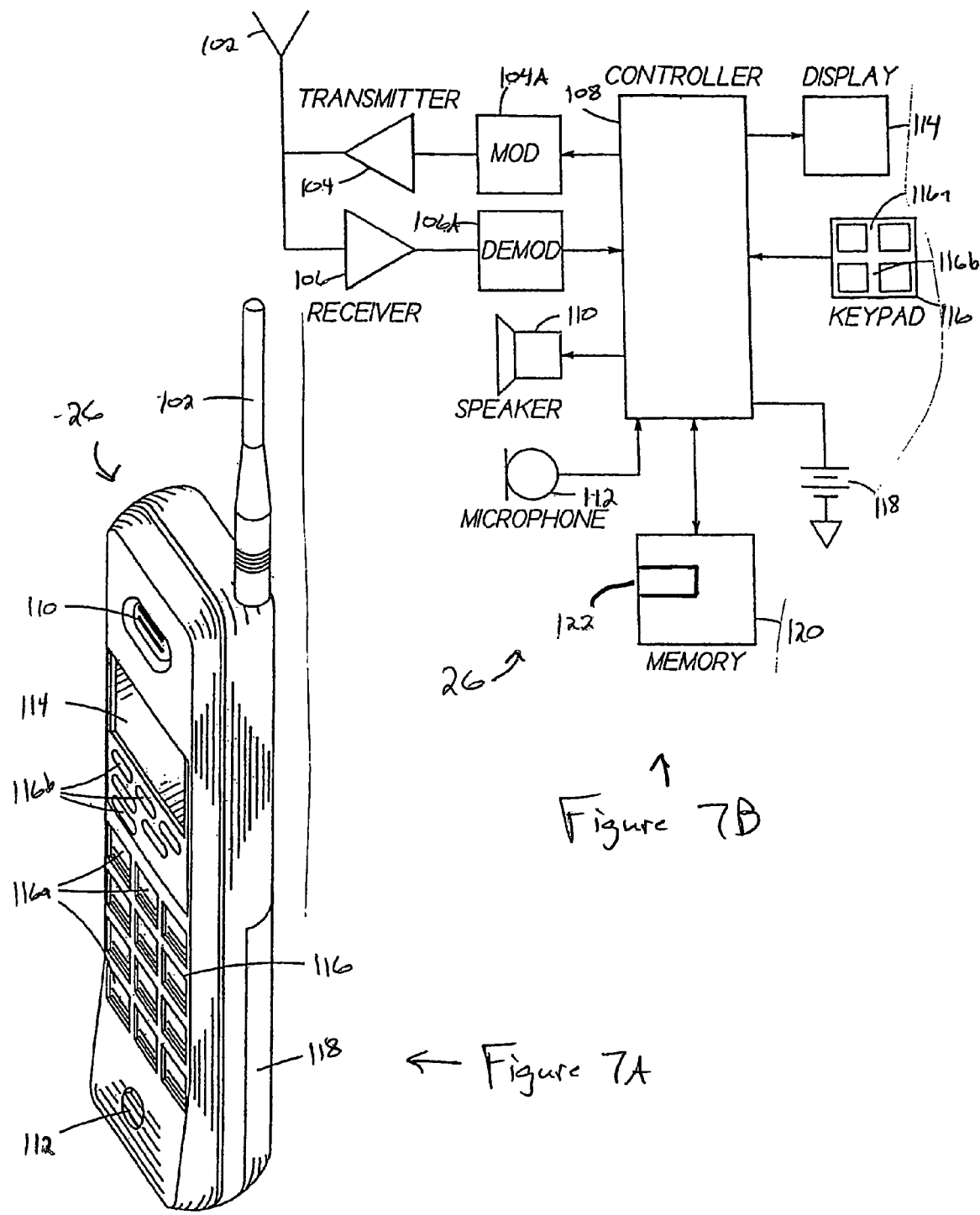
FIG. 7A is a perspective view.
FIG. 7B is a block diagram schematic, of a mobile station configured according to an aspect of the invention.

The mobile station 26 described in the above signaling interchange is now described with reference to FIGS. 7A and 7B. Certain of the electronics described in the block diagram of FIG. 7B are also within the above-described base station 24 and PDSN 30. The mobile station 26 may be, but is not limited to, a cellular telephone or a personal communicator. The mobile station 26 includes one or more antennas 102 for transmitting signals to and for receiving signals from a mobile node or base station 24. The base station 24 may be a part of a network comprising a PDSN 30 and a mobile switching center (MSC, not shown). The MSC provides a connection to landline trunks when the mobile station 26 is involved in a call. The mobile station 26 includes a modulator (MOD) 104A, a transmitter 104, a receiver 106, a demodulator (DE-MOD) 106A, and a controller 108 that provides signals to and receives signals from the transmitter 104 and receiver 106, respectively. These signals include signaling information in accordance with the air interface standard of the applicable cellular system, user speech and/or user generated data, and the signals described above with particularity. While the teachings of this invention can be readily applied to GSM-type TDMA mobile stations, they could be applied as well to code division/multiple access (CDMA) and other type of systems.

It is understood that the controller 108 also includes the circuitry required for implementing the audio (speech path) and logic functions of the mobile station. By example, the controller 108 may be comprised of a digital signal processor device, a microprocessor device, and various analog to digital converters, digital to analog converters, and other support circuits. The control and signal processing functions of the mobile station 26 are allocated between these devices according to their respective capabilities.

A user interface includes a conventional earphone or speaker 110, a conventional microphone 112, a display 114, and a user input device, typically a keypad 116, all of which are coupled to the controller 108. The user input device may also include a digital still or video camera. The keypad 116 includes the conventional numeric (0-9) and related keys (#,*) 116a, and other keys 116b used for operating the mobile station 26. These other keys 116b may include, by example, a SEND key, various menu scrolling and soft keys, and a power on/off key. These keys may also be co-located with the display 114 as a touch sensitive screen, their function may be actuated by voice-recognition via the speaker 112, or otherwise differently embodied to perform the same or expanded functionality as is known for traditional 116a and other 116b keys. The mobile station 26 also includes a removable battery 118 for powering the various circuits that are required to operate the mobile station 26.

The mobile station 26 also includes various memories, shown collectively as the memory 120, wherein are stored a plurality of constants and variables that are used by the controller 108 during the operation of the mobile station. For example, the memory 120 stores the values of wireless system parameters, a unique identifier for the mobile station 26, an operating program for controlling the operation of the controller 108 (each typically in a ROM device), and various software application programs for running specific applications within the context of the operating program (the application programs being typically in a read/write RAM device). The operating program in the memory 120 includes routines to present messages and message-related functions to the user on the display 114, typically as various menu items.

In accordance with an aspect of the invention, an application software program 122, which may be a stand alone program or one that additionally modifies other pre-existing programs (such as to construct a message 44 with certain data not otherwise present), is stored in the memory 120 that maps data type to at least one quality parameter. The mobile station 26 determines an underlying data type for an uplink or downlink packet, uses the application program 122 to determine which quality parameter(s) to apply to that data type, and sends the QoS parameter request message 44 as described above. This QoS parameter request message 44 is novel in that it includes both the QoS parameters from the software application map and the service instance identifier, and preferably also the flow (created in the MS) to which the QoS parameter(s) are to apply. Further, the application program causes the MS 26 to send, in response to (i.e., automatically) receiving the service connect message 48, 48', the RESV or filter message 58, 70, 78, 82, 90 that carries the QoS parameter(s) and the service instance identifier, and preferably also the flow direction and the flow identifier that is created for the flow in the MS 26.

Most of the above circuitry of FIG. 7B is also present in the RN 24 and the PDSN 30, typically excepting the microphone 112, battery 118, speaker 110, display 114 and keypad 116. The RN 24 and the PDSN 30 each have an application software program to construct the messages detailed above that are transmitted from those respective nodes, certain of them in response to receiving other messages from either the MS 26, MN 24, or the PDSN 30 as particularly detailed in the preferred and alternative embodiments above.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for establishing a flow comprising:
   receiving at a wireless network node from a mobile station a first request message, said first request message comprising at least one quality of service parameter for the flow;
   after receiving the first request message, the wireless network node granting a plurality of quality of service parameters; and
   sending from the wireless network node to a packet data switching node a registration request message, the registration request message comprising one or more of the granted quality of service parameters.

2. The method of claim 1 wherein the wireless network node is a radio node.

3. The method of claim 1, further comprising:
   sending from the wireless network node to the mobile station a reply message, said reply message comprising the granted plurality of quality of service parameters and airlink parameters for the flow.

4. The method of claim 3, wherein said reply message further comprises a flow identifier.

5. The method of claim 2 further comprising receiving, from a node other than the wireless network node and the mobile station, a subscriber profile that includes a series of quality parameters associated with the mobile station.

6. The method of claim 2, further comprising:
   receiving from the mobile station a filter message, said filter message comprising at least one packet filter.

7. The method of claim 6, wherein the at least one packet filter comprises a plurality of packet filter content options, and the at least one packet filter is identified by a flow identifier.

8. The method of claim 2 further comprising:
   determining at the wireless network node that the flow cannot be further supported to meet the plurality of quality of service parameters that were granted;

sending from the wireless network node to the packet data switching node a modified registration request message that comprises at least one updated quality of service parameter; and receiving at the wireless network node authorization to satisfy the at least one updated quality of service parameter.

9. The method of claim 8, wherein the modified registration request message comprises an identifier for the flow.

10. The method of claim 1 further comprising:

determining a policy to apply to a packet transported on the flow, and mapping an identifier associated with the flow to the policy.

11. The method of claim 10, wherein determining the policy is at a further node, the method further comprising enforcing the policy at the further node on the packet sent in at least one of an uplink and a downlink direction.

12. The method of claim 10 wherein determining the policy is at the wireless network node, the method further comprising enforcing the policy at the wireless network node for the packet sent at least in an uplink direction from the wireless network node to the packet data switching node.

13. The method of claim 10 wherein determining the policy is at the further node, the method further comprising enforcing the policy at the wireless network node at least for the packet sent in an uplink direction from the wireless network node to the further node.

14. A signaling protocol method to enable an assured quality on a flow comprising:

a radio node receiving from a mobile station a request that includes at least one quality of service parameter for the flow;

after the receiving, the radio node sending to the mobile station a grant of a set of quality of service parameters for the flow;

after the receiving, the radio node further sending a registration request to a packet data switching node that includes the granted set of quality parameters for the flow; and after sending the registration request, the radio node receiving from the packet data switching node a registration reply that authorizes the flow.

15. The signaling protocol method of claim 14, wherein the grant comprises an identifier for the flow which is sent with the granted set of quality of service parameters.

16. The signaling protocol method of claim 14 wherein the request received from the mobile station comprises an identifier for the flow.

17. A wireless network node comprising:

a receiver configured to receive a quality of service parameter request message, the request message comprising at least one quality of service parameter for a flow;

a controller configured to determine and to grant at least one quality of service parameter for the flow in response to the request message being received at the receiver; and a transmitter configured to send a registration request message to a packet data switching node in response to the controller determining and granting, the registration request message comprising the granted at least one quality of service parameter; and the transmitter configured also to send a reply message comprising the granted at least one quality of service parameter to the mobile station.

18. The signaling protocol method of claim 14, further comprising:

the mobile station signaling the packet data switching node via the radio node with packet filters that identify the flow.

19. The wireless network node of claim 17, wherein the registration request message comprises an identifier for the flow.

20. A wireless network node comprising:

means for receiving from a mobile station a quality of service parameter request message that comprises at least one quality of service parameter for a flow;

controller means for determining and granting at least one quality of service parameters for the flow after the request message is received at the means for receiving; and means for sending, in response to the controller means determining and granting, a registration request message comprising the granted at least one quality of service parameter to a packet data switching node; and also for sending a reply message comprising the granted at least one quality of service parameter to the mobile station.

21. The wireless network node of claim 20, wherein the means for receiving comprises a receiver coupled to at least one receive antenna, the controller means comprises an electronic controller, and the means for sending comprises a transmitter coupled to at least one transmit antenna that may be said at least one receive antenna.

22. The signaling protocol method of claim 18 wherein the mobile station sending a filter message to the packet data switching node that comprises at least one packet filter for the flow.

23. The signaling protocol method of claim 18 further comprising receiving at the packet switching data node from an AAA node a series of quality of service parameters associated with the mobile station.

24. The wireless network node of claim 19, wherein the registration request message further comprises the at least one quality of service parameter which the controller grants.

* * * * *